April 7, 1931.  E. J. ARCAND ET AL  1,799,880

VEHICLE SPRING

Filed March 16 1928

Inventors.
Edgar J. Arcand
George A. Downey
Joseph R. Walker by Heard Smith & Tennant.

Attys.

Patented Apr. 7, 1931

1,799,880

UNITED STATES PATENT OFFICE

EDGAR J. ARCAND, OF BOSTON, GEORGE A. DOWNEY, OF HYDE PARK, AND JOSEPH R. WALKER, OF ATLANTIC, MASSACHUSETTS

VEHICLE SPRING

Application filed March 16, 1928. Serial No. 262,030.

The present invention relates to vehicle springs, and particularly to means for reinforcing the springs at or adjacent the eyes thereof.

A principal object of the invention is to produce a spring that is reinforced at those points where breakage most frequently occurs.

A further object is to provide a construction which will allow the designer to produce a spring which is reinforced against breakage and yet may be light enough in its action to insure a smooth riding vehicle. A distinct advantage of the construction lies in the fact that stresses developed by violent shocks from rough roads, sudden application of brakes, etc., are utilized automatically to reinforce the springs.

The invention is particularly adaptable to vehicles employing the Hotchkiss drive wherein the reaction upon the rear axle due to the torque of the drive shaft and the reaction due to the use of the brake is absorbed directly by the springs. It has been found in the use of such a drive that the springs will break at or near the eyes. By employing the principles of the present invention, this weakness is overcome, thus prolonging the life of the springs and avoiding the inconvenience and danger resulting from breakage.

The results above set forth are accomplished by a special arrangement of the elements which results in reinforcing the spring at those points where breakage most frequently occurs. The essential elements of the invention are a main long leaf, a supplemental long leaf, and a series of superimposed leaves. The two former leaves are so shaped and associated that if the main leaf breaks, the other leaf will sufficiently support the car and prevent the rear axle from slipping out of alinement. The invention may be embodied only in the end of the spring which is subjected to the greatest torque, but desirably is applied to both ends of the spring.

In the embodiment of the invention illustrated one of the long leaves is provided with an extension which overlies the adjacent portion of the end of the spring. The extension is provided with a clip which embraces the long leaf or leaves and one or more of the supplemental leaves and constitutes automatic means for utilizing the stresses applied to the eyes of the spring to bind the ends of the leaves together only when excessive stresses occur.

Preferred embodiments of the invention are illustrated in the accompanying drawings, in which, Fig. 1 is a view showing a spring employing the principles of the invention applied to the frame of the vehicle;

Figure 1:
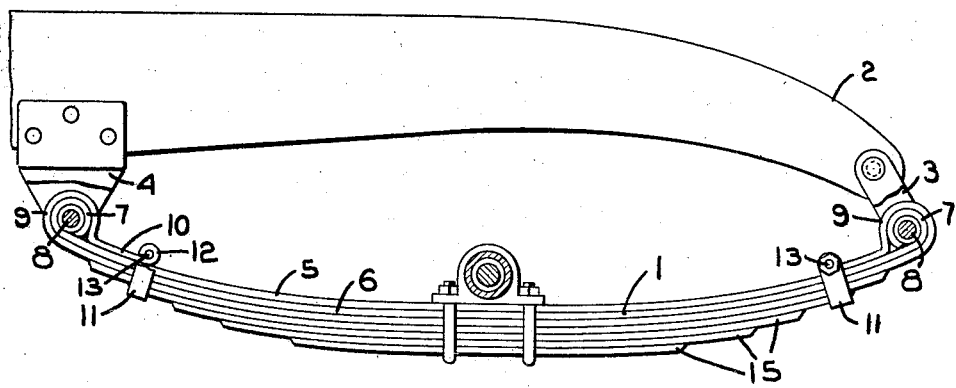

In the preferred embodiment of the invention illustrated herein, a semi-elliptic spring 1 is shown applied to a vehicle frame 2 by means of a shackle 3 at the rear and a bracket 4 at its forward end. The rear axle housing of the vehicle is bolted to the spring in the usual manner. The spring is made up of a main long leaf, a supplemental long leaf, and a series of leaves superimposed thereon.

The main long leaves 5 and 6 of the spring are provided with eyes to embrace shackle bolts. The upper or main leaf 5 has the usual eyes 7 formed therein to receive the shackle bolts 8. The lower or supplemental long leaf 6 is provided with eyes 9 which surround and closely embrace the eyes 7 of the main long leaf. The eyes 9 are of special construction having extensions 10 overlying the upper part of the main leaf. These extensions are of the same temper and have the same resilient quality as the leaves of the spring. A clip 11 is secured to the extension in any suitable manner. We have shown herein the extension 10 as having an eye 12 formed therein to receive a bolt 13. The clip 11 is U-shaped and embraces the long leaf and also one or more of the supplemental leaves 15 of the spring. The two legs of the clip 11 have apertures to receive the bolt 13.

Figure 3:
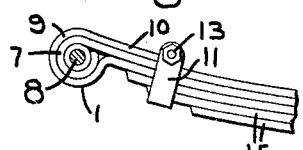
Fig. 3 is a view showing a modification of the device.

In Fig. 3 we have shown a different form of the device. The eyes 7 and 9 are bent downwardly and the extension 10 lies above the main leaf. However, the action of the device is the same as will hereinafter appear.

Figure 5:
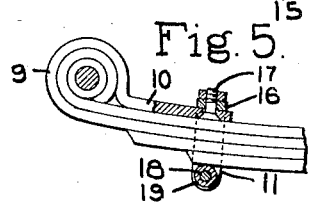

Fig. 5 illustrates a novel means of applying the spring clip. The U-shaped clip 11 is in an inverted position relatively to that shown in Fig. 2. The cross member 16 of the clip is drilled to receive a plow bolt 17, the head of which is countersunk into the end of the overlying portion 10 of the leaf 5 in order that the overlying portion may lie closely against the adjacent portion of the leaf 5. The legs of the clip embrace the leaves and receive a retained bolt 18 at their free ends upon which is mounted a sleeve 19. As motion is imparted to the clip by the flexing of the spring, the sleeve 19 provides roller action for the clip as it moves longitudinally of the leaves.

Figure 2:
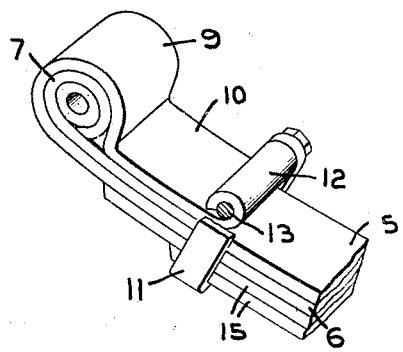
Fig. 2 is a detail perspective view of the end section of the spring.
Figure 4:
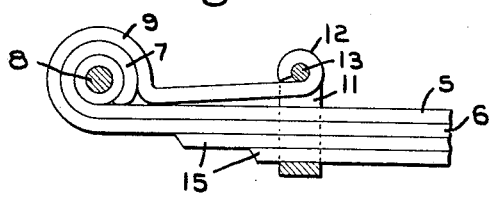
Fig. 4 is a diagrammatic view illustrating the reinforcing action of the device; and, Fig. 5 is a view, partly in cross section, illustrating a modification of the structure of the eye section of the spring.

In Figs. 1, 2, and 3 the device is shown in a normal or static position, while Fig. 4 shows more or less diagrammatically the action of the spring under a severe shock or suddenly applied load.

In the use of the device, the clip 11 is adjusted to exert little or no tension upon the leaves 15, thereby allowing free play of the spring on moderately rough roads. When, however, power or brakes are applied or a rough road is encountered, the spring is flattened and the extension 10 will tend to retain its normal shape, as shown in Fig. 4 much exaggerated. Since the extension 10 is connected to the clip, it will pull the extension out of its normal shape and thereby create resulting forces which will cause the clip 11 to clamp certain of the superimposed leaves and the long leaf or leaves firmly together, thereby strengthening the spring at its weakest point, and also increasing interleaf friction between the leaves, thus clamped together, thereby increasing the resistance of the spring to flexure.

It will be understood that the particular embodiments of the invention disclosed herein are illustrative and not restrictive, and that various changes in form, construction and arrangement of parts may be made within the spirit and scope of the following claims.

Having thus described the invention, what is claimed as new, and desired to be secured by Letters Patent, is:

1. A leaf spring for vehicles comprising a main long leaf having an eye at its end to receive a shackle bolt and a series of superimposed leaves including a supplementary long leaf adjacent to the main leaf and having an eye at its end which encloses the eye in the said main long leaf and presenting an extension which overlies a portion of the main leaf near the eye thereof and a clip connected to said extension embracing a plurality of the superimposed leaves whereby said extension and clip will operate to bind together the leaves of the spring near the eye thereof when forces are applied at said eye.

2. A leaf spring for vehicles comprising a main long leaf having eyes at its ends to receive shackle bolts and a series of superimposed leaves including a supplementary long leaf adjacent to the main leaf and having eyes at its ends which enclose the eyes in the said main long leaf and presenting extensions which overlie a portion of the main leaf near the eyes thereof and clips connected to said extensions embracing a plurality of the superimposed leaves whereby said extensions and clips will operate to bind together the leaves of the spring near the eyes thereof when forces are applied to the said eyes.

3. A leaf spring for vehicles comprising a main leaf having eyes at its ends to receive shackle bolts and a series of superimposed leaves including a supplementary long leaf adjacent to said main leaf and having eyes at its ends which enclose the eyes in said main leaf and presenting extensions which overlie a portion of the main leaf near the ends thereof, and a clip connected to said extensions embracing a plurality of the superimposed leaves whereby as forces are applied to flex the spring, said extensions will exert a force on the clip to bind the embraced leaves thereby in proportion to the degree to which the spring is flexed.

4. A leaf spring for vehicles comprising a main leaf formed of two superimposed sections, a plurality of supplemental leaves superimposed upon the main leaf, eyes formed at the ends of both the main leaf sections, the eyes of one section enclosing and reinforcing the eyes in the other section, extensions of the eyes of one of said sections overlying the main leaf a distance from the eye toward the mid-point of the spring, a clip secured to said extensions and embracing the main leaf and one or more of the supplemental leaves, whereby as forces are applied to the eyes thereof, resulting forces will be transmitted to the said extensions and thence to said clip, causing the enclosed spring leaves to be bound together and thus to reinforce each other.

In testimony whereof, we have signed our names to this specification.

EDGAR J. ARCAND.
GEORGE A. DOWNEY.
JOSEPH R. WALKER.